United States Patent [19]
Brice et al.

[11] Patent Number: 5,749,641
[45] Date of Patent: May 12, 1998

[54] OPTICAL PROJECTOR

[75] Inventors: Steve Brice, Portland; Gary Kingsley, Tigard; David Payne, Hillsboro, all of Oreg.

[73] Assignee: Delta America Ltd., Fremont, Calif.

[21] Appl. No.: 782,652

[22] Filed: Jan. 14, 1997

Related U.S. Application Data

[62] Division of Ser. No. 590,395, Jan. 25, 1996, Pat. No. 5,605,390.

[51] Int. Cl.⁶ .................................................. G03B 21/14
[52] U.S. Cl. .................................................. 353/81; 359/831
[58] Field of Search ............................ 353/33, 81, 119; 359/831, 833, 834, 837

[56] References Cited

U.S. PATENT DOCUMENTS

| | | | |
|---|---|---|---|
| 4,784,469 | 11/1988 | Tsukada et al. | 359/831 |
| 4,786,146 | 11/1988 | Ledebuhr | 353/20 |
| 4,850,685 | 7/1989 | Kamakura et al. | 353/34 |
| 4,981,352 | 1/1991 | Tejima et al. | 353/81 |
| 5,067,799 | 11/1991 | Gold et al. | 359/638 |
| 5,097,323 | 3/1992 | Sato et al. | |
| 5,214,457 | 5/1993 | Takanashi et al. | 353/31 |
| 5,221,998 | 6/1993 | Sugahara | 359/831 |
| 5,231,431 | 7/1993 | Yano et al. | 353/31 |
| 5,241,407 | 8/1993 | Sonehara et al. | |
| 5,270,804 | 12/1993 | Lach | 353/33 |
| 5,276,523 | 1/1994 | Kurematsu et al. | 353/101 |
| 5,283,602 | 2/1994 | Kwon | 353/69 |
| 5,404,234 | 4/1995 | Taniguchi et al. | 348/744 |
| 5,418,583 | 5/1995 | Masumoto | 353/38 |
| 5,467,154 | 11/1995 | Gale et al. | 353/119 |
| 5,570,231 | 10/1996 | Mogamiya | 359/831 |
| 5,653,522 | 8/1997 | Loucks | 353/31 |

*Primary Examiner*—William Dowling
*Attorney, Agent, or Firm*—Skjerven, Morrill, MacPherson Franklin & Friel; David W. Heid

[57] ABSTRACT

An optical projector is described that orients its optics engine preferably vertically within an enclosure that is higher than it is wide or deep. The invented optics engine uses a prismatic cube for color separation or beam splitting, with the prismatic elements within the cube being secured within a durable frame that mounts the three color light valves, e.g. twisted nematic liquid crystal display (LCD)-type shutters, in a predefined position and orientation relative to the prismatic cube. In order to improve image quality and brightness, especially of the notoriously difficult-to-reproduce green color, red and blue beams are S polarized, as is conventional, but the green beam is P-polarized. The invented optical projector preferably includes a frame having a footing portion for resting on a support surface, a light source high above the footing portion, optical convolution structure downstream from the light source for reverse-bending downwardly flowing light from the source, light modulation structure near the reverse bend region for infusing the light with image information and for directing modulated light upwardly in a projectable, image-containing stream of light and outward-projection directing structure high on the frame for receiving and outwardly directing such stream of light.

5 Claims, 7 Drawing Sheets

OPTICAL PROJECTOR

This is a divisional application Ser. No. 08/590,395, filed Jan. 25, 1996 now U.S. Pat. No. 5,605,390.

BACKGROUND AND SUMMARY OF THE INVENTION

The invention generally relates to optical projectors for producing color images on screens in response to tri-color pixel image data. More particularly, the invention concerns an optic engine architecture, a polarization technique and an overall configuration for such optical projectors that represent significant improvements in image quality, durability and portability.

Conventional optical projectors have a horizontal form factor that produces a relatively large footprint or horizontal outline on the stand, table or support surface. The image is projected from such prior art projectors from a height that is very few inches above the support surface, whereas the screen or display surface is at a substantially higher elevation so that it is easily viewable by persons in a conference room or lecture hall. Such upward image projection systems suffer from a well-known phenomenon called Keystone distortion. Conventional projectors tend to be bulky and barely portable, by which is meant they typically are transported on a wheeled cart because they cannot be comfortably hand-carried by the average person. Finally, conventional projectors require a fair amount of preventive and corrective maintenance of their optics engines, or modules, because of their relative fragility and tendency to be jarred out of alignment from normal use.

The invented optics engine uses a prismatic cube for color separation or beam splitting, with the prismatic elements within the cube being secured within a durable frame that mounts three monochrome light valves, e.g. twisted nematic liquid crystal display (LCD)-type shutters, in a predefined position and orientation relative to the prismatic cube. In order to improve image quality and brightness, especially of the notoriously difficult-to-reproduce green color, red and blue beams are S-polarized, as is conventional, but the green beam is P-polarized. Edge jitter in all three colored beam paths is minimized preferably or eliminated by guard banding thereagainst by polarizer design, e.g. by selection of polarizer plane and bandpass characteristics.

The invented optical projector preferably includes a frame having a footing portion for resting on a support surface, a light source high above the footing portion, optical convolution structure downstream from the light source for reverse-bending downwardly flowing light from the source, light modulation structure near the reverse bend region for infusing the light with image information and for propelling modulated light upwardly in a projectable, image-containing stream of light, and outward-projection directing structure high on the frame for receiving and outwardly directing such stream of light. This optical projector structure, in its preferred embodiment, has a tower-like configuration, with a small footprint, and a very lightweight, yet durable, construction having high image quality including brightness.

These and other objects and advantages of the invention will be more clearly understood from a consideration of the accompanying drawings and the following description of the preferred embodiment.

DETAILED DESCRIPTION OF THE PREFERRED EMBODIMENT

Figure 1:
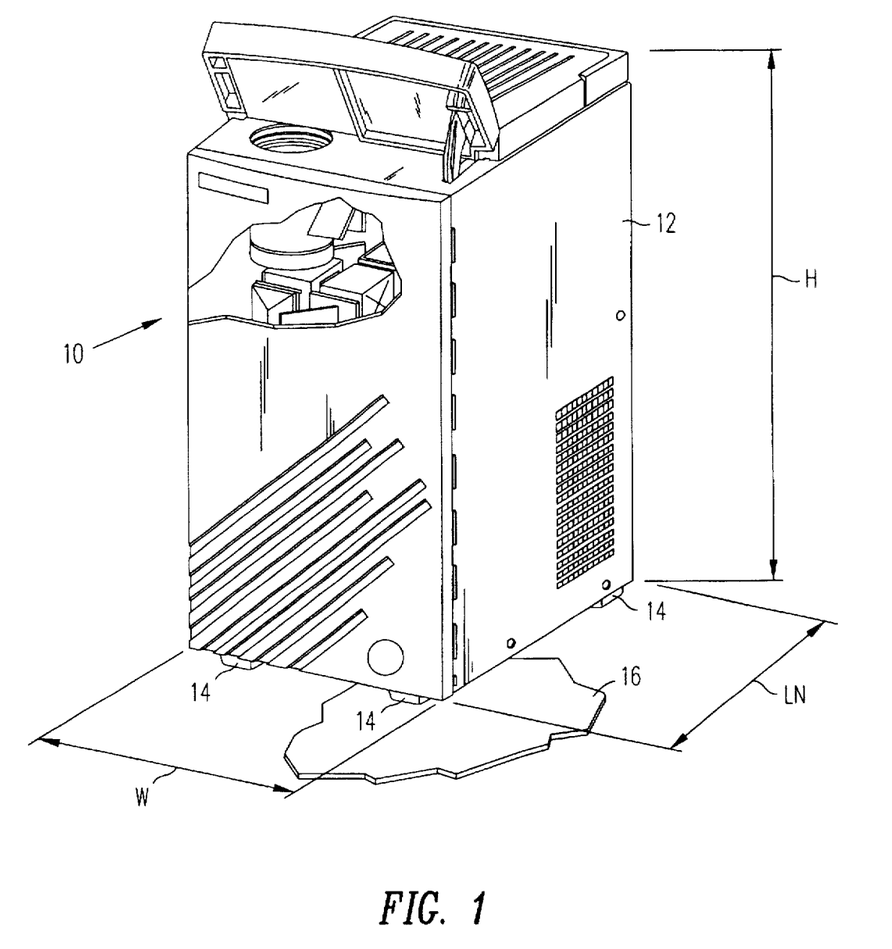
FIG. 1 is an isometric view of the invented optical projector made in accordance with a preferred embodiment thereof.
Figure 2:
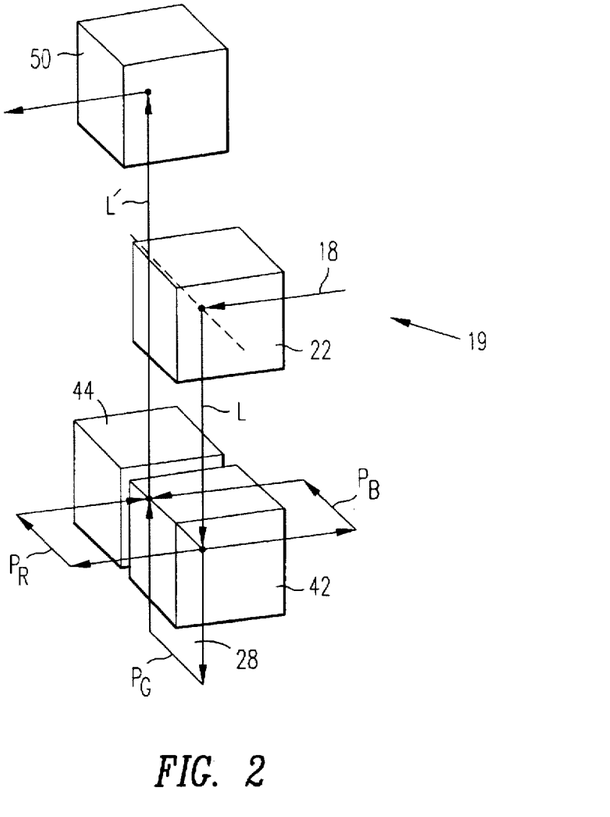
FIG. 2 is a schematic diagram, corresponding to the isometric view of FIG. 1, of the projector's optical beam paths.
Figure 6:
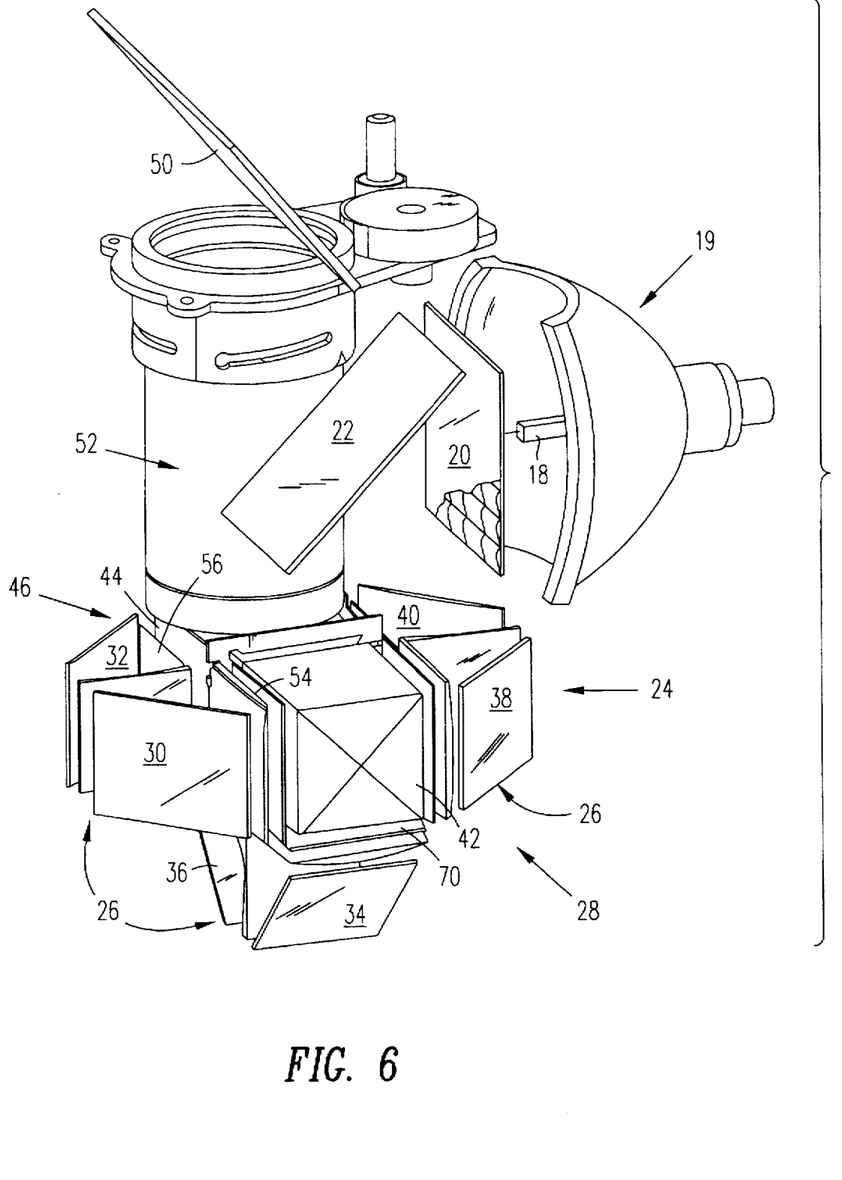
FIG. 6 is a somewhat simplified isometric view of the optical module of the invented projector, showing its major optical components.

Referring first and collectively to FIGS. 1, 2 and 6, invented optical projector 10 is shown in an isometric, front/right side view. Projector 10 may be seen to include, in accordance with the preferred embodiment of the invention, a frame 12 having a footing portion 14 restable on an external support structure 16 such as a table or lectern. Projector 10 also may be seen preferably to include a light source lamp/reflector assembly 18 mounted on frame 12, high thereon in relation to footing portion 14. Lamp/reflector assembly 18 forms part of a light source 19 in projector 10 (as will be explained), which source is designed to direct a beam of so-called white light L in a flow downwardly from source 19 toward footing portion 14, as perhaps best illustrated in FIGS. 2 and 6. It may be seen therefrom that, in accordance with the preferred embodiment, the mentioned light source further includes a planar ultraviolet/infrared filter 20 and a planar folding or turning mirror 22, although it will be appreciated that folding mirror 22 forms no necessary part of the invention, inasmuch as light source 19 might direct light L directly downwardly instead of first forwardly and then downwardly by reflection from folding mirror 22. Indicated only fragmentarily and somewhat schematically, for the sake of clarity, in FIG. 6, is a preferred embodiment feature by which the downstream surface of filter 20 is configured with a pillow-type integrator lens for spreading image brightness and minimizing so-called hot spots. A similar pillow-type integrator lens preferably is situated downstream from turning mirror 22 and (also not shown) immediately upstream from the upper beam entry face of X-cube optical splitter 42.

Projector 10 further includes optical convolution structure 24 communicatively associated with, and located optically downstream from, light source 19. Convolution structure 24 may be seen from FIG. 6 to include optical-path-folding reflector structure 26, or componentry, such as one or more folding mirrors, which, effectively, causes light which is downwardly flowing from source 19 to flow through a reverse-bend region 28 defined by the componentry. In accordance with the preferred embodiment of invented projector 10, such componentry includes three pairs of folding mirrors, one for each of the colors red (R), green (G) and blue (B). These folding mirrors are visible in FIG. 6 at 30, 32, 34, 36, 38, 40, and are depicted schematically in FIGS. 3 and 4 to be discussed. It may be seen from FIG. 2 that, in accordance with the preferred embodiment of the invention, reverse-bend region 28 is characterized by three reverse-bend paths $P_R$, $P_G$, $P_B$. The two paths $P_R$ and $P_B$ may be seen from FIG. 2 to be substantially co-planar and the third path $P_G$ may be seen to lie in a plane which is substantially orthogonal to the common plane of the first-mentioned two reverse-bend paths $P_R$, $P_B$.

Preferably, optical convolution structure 24 includes a beam splitter, or X-cube optical splitter, 42, and a beam recombiner, or X-cube optical combiner, 44, as shown in FIGS. 2 and 6. X-cube optical splitter 42 preferably is in the form of a right cube, and will be understood to have interior, 45° planar surfaces that are coated or otherwise treated selectively to reflect lights of different colors so that white light entering a top surface of the cube produces differentiatedly pure red, green and blue light beams, with the red beam exiting a first face of the cube toward turning mirror 30, with the blue beam exiting an opposite face of the cube toward turning mirror 38 in the same horizontal plane as that of the red beam, and with the green beam exiting the bottom face of the cube toward turning mirror 34. It will be understood that turning mirror pairs 30 and 32, 34 and 36, 38 and 40 are preferably 45° inclined planar mirrors that, by their pair-wise positional and orientational configuration direct the R, G and B beams into X-cube optical combiner 44. It will also be understood that the red and blue beams, within the spirit and scope of the invention, may be swapped front-to-back.

Optical X-cube beam combiner 44 preferably also is in the form of a right cube, and will be understood also to have interior, 45° planar surfaces that are coated or otherwise treated to reflect the R, G and B beams entering its three faces upwardly into a white beam of light representing the combination of the R, G and B beams. It will be understood that, in accordance with the invention, the R, G and B beams that enter the faces of beam combiner 44 are modulated to produce an image-containing stream of light L', as next will be described.

Projector 10 also preferably includes light-modulation structure 46 disposed adjacent reverse-bend region 28 designed to interact with light traveling through reverse-bend region 28, thereby to modulate the same light so as to infuse it with projectable image information, with optical convolution structure 24 propelling such modulated light upwardly on the optical downstream side of reverse-bend region 28 in a projectable, image-containing stream of light L'. Light-modulation structure 46 may be seen by reference to FIG. 6 preferably to include pixelating light-valve structure 48, which will be described in more detail by reference to FIGS. 3, 4, 7 and 8. In accordance with one aspect of the invention, projector 10 preferably includes outward-projection directing structure 50 mounted, and located high, on frame 12 in relation to footing portion 14 thereof for receiving and outwardly directing modulated, image-containing stream of light L'.

As can be seen from a study of FIG. 2, streams of light L, L'flow along upright paths which lie in an upright plane that is substantially the same as the plane containing reverse-bend path $P_G$. Were the organization depicted in FIG. 2 to be viewed from either lateral side of the projector, one would note that the just-mentioned upright plane, and the common plane containing paths $P_R$ and $P_B$, cross one another in a fashion creating the spacial organization of what might be thought of as a the inverted letter T. It may also be seen from FIG. 2 that the respective paths along which light flows (1) downwardly in projector 10 from light source 19, as indicated by light stream L, and (2) upwardly from the downstream side of reverse-bend region 28, as indicated by light stream L', are laterally spaced from one another in the projector.

Figure 9:
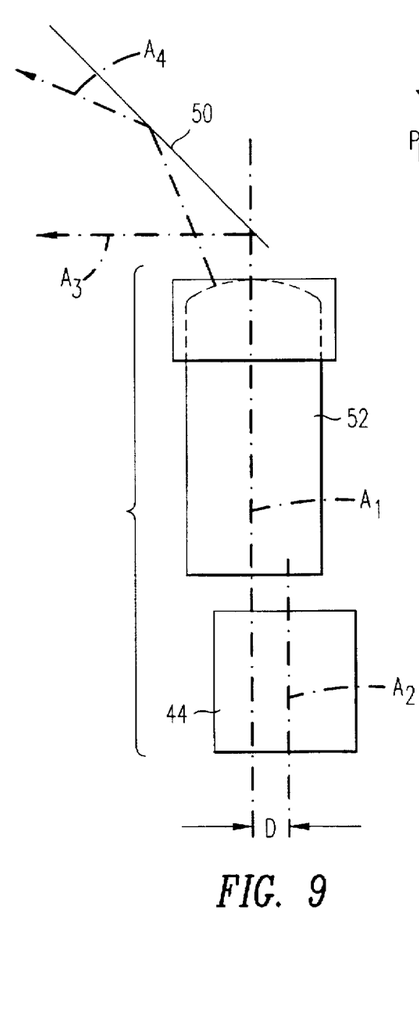
FIG. 9 is a schematic diagram in side elevation of the projector's exit image beam path.

Referring briefly and collectively now to FIGS. 2, 6 and 9, projector 10 may be seen preferably to include, immediately upstream optically relative to outward-projecting directing structure 50, an optical lens stack 52 having a long axis $A_1$, with optical convolution structure 24 including X-cube optical combiner 44 positioned adjacent the optically upstream end of lens stack 52, and with optical combiner 44 including a projection axis $A_2$ which substantially parallels, and which is laterally offset relative to, long axis $A_1$ of lens stack 52. This offset, indicated as D in FIG. 9, provides an important advantage. By so offsetting axes $A_1$ and $A_2$, light emerging from the lens stack interacts with directing structure 50 in such a fashion as to produce outward projection/direction as indicated by dash-dot arrows $A_3$, $A_4$ in FIG. 9. The entire vertical content of each projected image is contained between these two arrows, and one can see that lower arrow $A_3$ indicates that the lower edge of a projected image travels outwardly substantially horizontally, and that the upper edge of each image travels outwardly at an upwardly inclined angle as represented by upper arrow $A_4$. Offsetting of axes $A_1$ and $A_2$ results in the entire vertical content of each image emerging from the lens stacks immediately to the left side only of axis $A_1$ as pictured in FIG. 9. The whole result of this situation is that, quite apart from the preferred tower characteristic of the projector minimizing Keystone distortion, emergent projection in the manner just described further minimizes Keystoning problems.

It now may be appreciated, especially by viewing FIG. 1, that projector 10 has a long axis which, with the projector in an operative condition, extends substantially vertically from footing portion 14. Thus, when projector 10 is viewed downwardly along such long axis, the projector may be seen to have a footprint with orthogonal, transverse dimensions each of which is smaller than the height of the projector measured along such long axis. In accordance with a preferred embodiment of the invention, projector 10 is approximately 13 and ½ inches high (H) (representing its long axis), approximately 6 and ½ inches wide (W) (representing one of its footprint's orthogonal, transverse dimensions) and approximately 9 inches deep (LN) (representing the other of its footprint's orthogonal, transverse dimensions). Those of skill in the art will appreciate that, within the spirit and scope of the invention, other relatively smaller footprints and other relatively larger vertical dimensions of the projector may be envisioned that would produce many if not all of the advantages of the invention.

Figure 3:
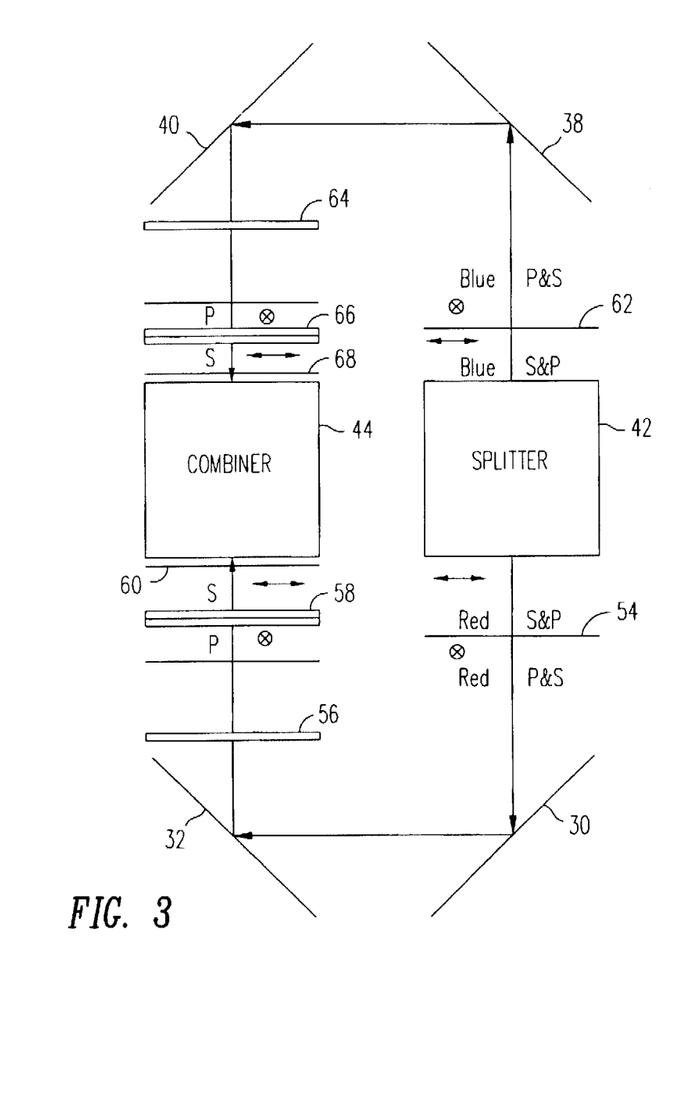
FIG. 3 is a schematic diagram illustrating in a top-down view of the projector the polarization of the red and blue beam paths.
Figure 4:
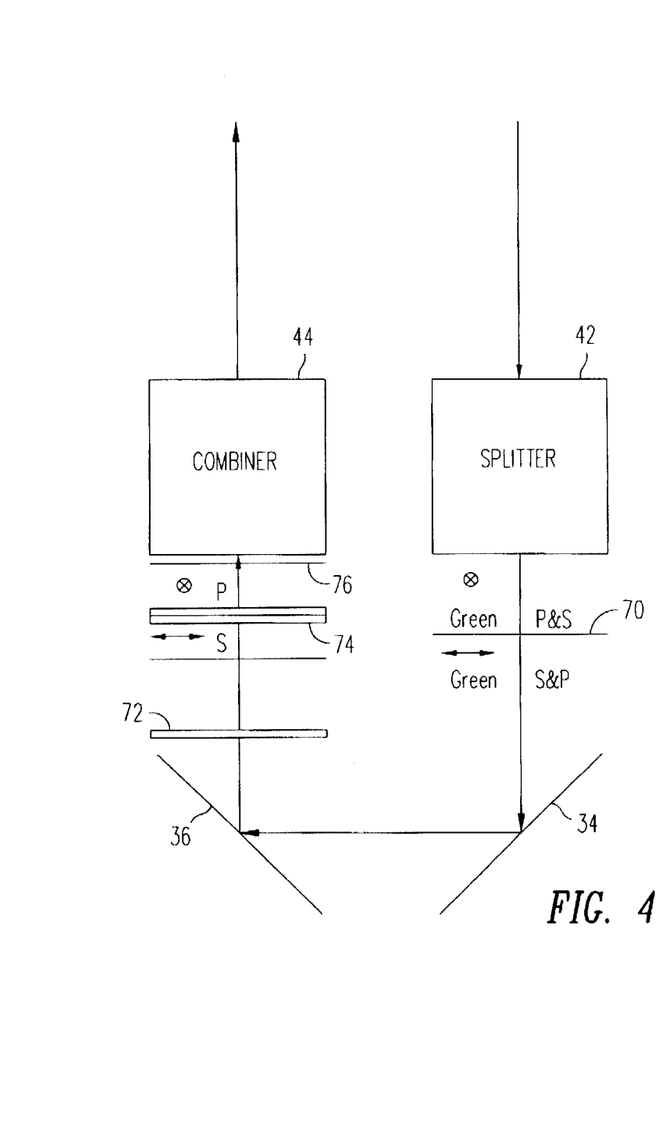
FIG. 4 is a schematic diagram illustrating in a front elevational view of the projector the polarization of the green beam path.

Considering now FIGS. 3 and 4, the detailed operation of the optical mechanism of projector 10 may be understood. Initially, it is noted that P- and S-polarization, as discussed herein, are relative to the reflective coating surfaces within X-cube optical combiner 44, i.e. P-polarization is in the plane of the reflective surfaces and S-polarization is normal thereto.

FIG. 3 is a front-to-rear, oriented, top-down schematic illustration of the projector's optical layout, and may be seen to depict the R and B beam flows and polarization in their common, preferably substantially horizontal plane. The red (R) beam exits a face of optical splitter 42 and passes through a rotator 54 that transforms S-polarization to P-polarization and P-polarization to S-polarization. Rotator 54 preferably is implemented as a rotator film affixed to a plate of glass, as shown in FIG. 6. The polarized red beam is reverse-bent via turning mirrors 30, 32 and is purified as it passes through a red color purity filter 56, also depicted in FIG. 6. It will be appreciated that color purity filter 56 in accordance with the preferred embodiment has affixed thereto a polarizer film that blocks S-polarization. This feature is illustrated schematically as being separate from color purity filter 56, although it will be understood in the preferred embodiment shown in FIG. 6, that filter and polarizer are closely adjacent. The P-polarized red beam next passes through a twisted nematic LCD light valve 58 that forms a part of pixelating light-valve structure 48. It will be understood that twisted nematic LCD 58 rotates the polarization of light passing therethrough by 90°, thereby transforming P-polarization to S-polarization as indicated in FIG. 3. A laminar analyzing polarizer adhered to a face of optical combiner 44 provides the final polarization step that insures that only S-polarized red light enters optical combiner 44.

The blue (B) beam of light exiting a face of optical splitter 42 goes through a complementary set of optical elements that are symmetric with, but oppositely directed from that through which the red beam of light passes. Briefly, the blue beam of light passes through a rotator 62, is reverse-bent through turning mirrors 38, 40, passes through a blue color purity filter 64 having a laminar polarizer that blocks S-polarization, passes through a twisted nematic LCD 66 that transforms P-polarization to S-polarization and finally passes through an analyzing polarizer 68 preferably adhered to the opposite face of optical combiner 44, thus insuring that only S-polarized blue light enters optical combiner 44.

Turning now to FIG. 4, the flow and polarization of the green (G) beam of light will be described. It will be understood that FIG. 4 is a rearward view from the front of projector 10. White light enters a face of optical splitter 42, as from light source 19. Green light exiting the opposite face of optical splitter 42 passes through a rotator 70 that introduces a 90° rotation of the polarization, transforming P-polarization to S-polarization and S-polarization to P-polarization. It will be appreciate that, similar to the red and green beams of light, rotator 70 may be implemented preferably as a rotator film adhered to a plate of glass, as indicated in FIG. 6. Polarization-rotated green light exiting rotator 70 is reverse-bent via turning mirrors 34, 36, and passes through a green color purity filter 72 preferably having adhered thereto a polarizer film that blocks P-polarization. S-polarized green light passes through a twisted nematic LCD 74 that rotates the polarization by 9020 transforming S-polarization into P-polarization, as indicated in FIG. 4.

Finally, an analyzing polarizer 76 preferably adhered to the bottom face of optical combiner 44 insures that green light entering optical combiner 44 is P polarized. Thus, one aspect of the invention may be understood to involve an improved color polarization method for use in any multichrome projector wherein white light is split into plural color beams of light for modulation and recombination thereof to produce a pixelated color image for display. The improved method can be thought of as including the steps of: (1) first polarizing at least one of the plural color beams of light, e.g., red or blue, in a first orientation, e.g., S-polarization; and (2) second polarizing at least one other of the plural color beams of light, e.g., green, in a second orientation, e.g., P-polarization, that is different from the first orientation. It is this differentiated polarization of light in a multichrome projector that results in improved image quality by virtue of the fact that green light has been discovered to be better P-polarized whereas red and blue light are better S-polarized.

Those skilled in the art will appreciate that the second orientation, for example, in which green light is P-polarized, is substantially perpendicular to the first orientation in which, for example, red and blue are S-polarized. By polarizing at least one of the plural color beams of light, e.g., red and blue, in the S-plane and by polarizing at least one other of the plural color beams of light, e.g., green in the P-plane, improved image quality is realized.

Figure 5:
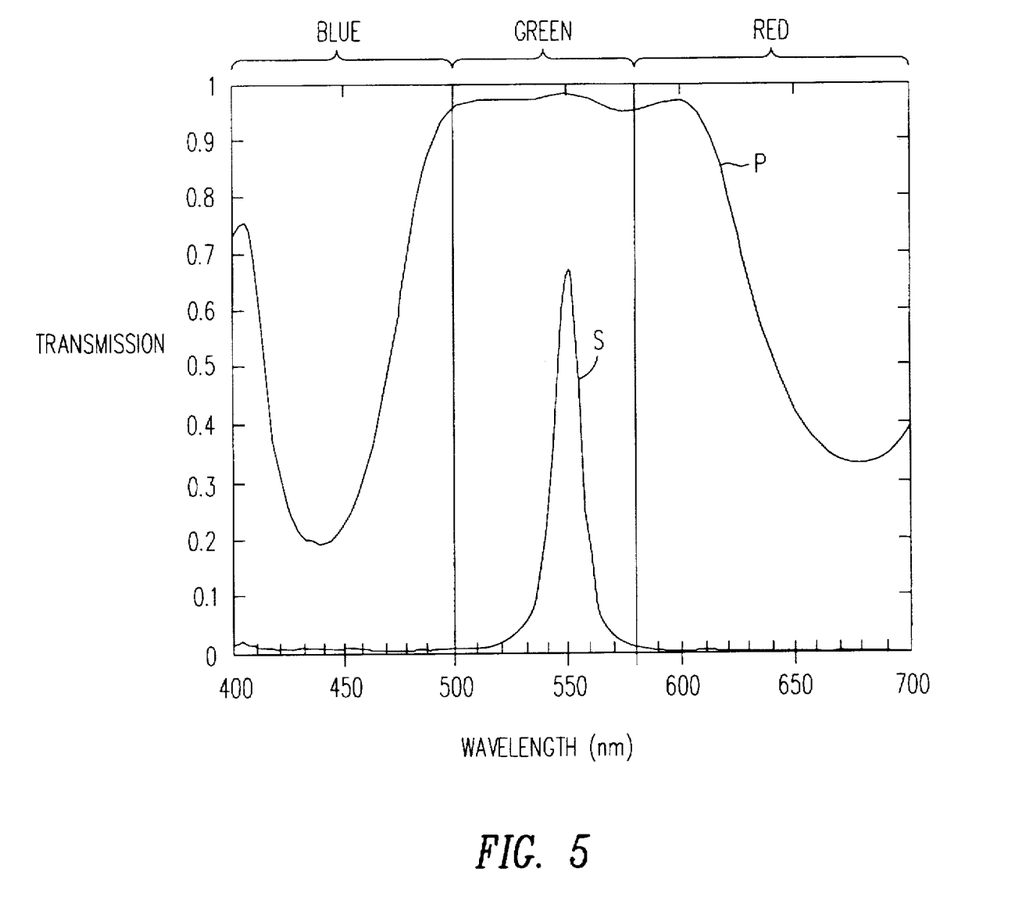
FIG. 5 is a graphic representation of the transmissivity effect of polarization of red, green and blue light bands within the invented projector.

Referring now briefly to FIG. 5, the improved polarization method will be better understood by reference to a graphic illustration of the transmissivity characteristics of projector 10 made in accordance with this preferred embodiment. With S-polarization of red and green beams of light, it may be seen from the graph that nearly complete transmission thereof is achieved. The upper trace on the graph of FIG. 5 represents the measured transmission of S-polarized red (R) and blue (B) light through the optical subsystem described above by reference to FIGS. 3 and 4. The lower trace, which represents P-polarization, may be seen to be centered on the nominal center of the green (G) pass-band, which renders P-polarization more effective in such an optical subsystem for the color green than would S-polarization.

From FIG. 5, it will be appreciated by those skilled in the art that the use of P-polarization for the green beam of light and S-polarization for the red and blue beams of light, as well as the design of the polarizers themselves, produces another important contribution to image quality. Light entering the surface of an optical element, though nominally normal thereto, usually has some divergent or convergent character, i.e. light entering the face is not exactly at right angles to the plane of the face. Even slight fluctuations in the angle of incidence of a beam of light upon the surface of an optical element having preferable polarization such as a prism or polarizer face results in what is known as edge jitter in the color band pass.

In accordance with another aspect of the invention, such edge jitter is guard-banded against by the selection of the type of polarization, e.g. S-polarization versus P-polarization, and of the color splitting coating material themselves, to better match the prismatic beam splitter transmission characteristics with that of the light entering its faces. Referring briefly again to FIG. 5, it may be seen that, in accordance with the preferred embodiment of the invention, there is a wide wavelength band or distance between adjacent vertically sloping aspects of the curves. Edge jitter, i.e., plus and minus 6% (of the wavelength) or even greater, in the color bands entering the prismatic cube, e.g. X-cube prismatic combiner 44, does not translate into image color jitter or distortion because it occurs outside of the bandpass of the color purity filters that form part of the optical subassembly.

These color bandpasses are represented in FIG. 5 by the labeled bands blue, green and red, which are separated by vertical lines in the graph. It is noted that the vertical lines, which represent the nominal congruent edge boundaries of adjacent colors, are intermediate the vertical slopes that represent the S-polarization and the P-polarization transmission curve edges. Those of skill in the art will appreciate that the minimum lateral distance between these vertical lines and laterally adjacent sloped curved lines representing the actual transmission characteristics of the prismatic cube is described herein as a guard-band that represents substantial protection against the possibility that fluctuations in the angle of incidence translate within projector 10 into color edge jitter in the projected image.

Thus, the improved color polarization method may be seen in the alternative to involve the step of polarizing at least one of the plural color beams of light in a multichrome projector in such a manner that the wavelengths of light passed through a color-combining or color-splitting optical surface are outside of a predefined band of wavelengths over which bandpass edge jitter might otherwise result from such fluctuation in the angle of incidence of the beams of light upon a surface of an optical element. Most preferably, of course, all such plural beams of light, e.g. the red, green and blue beams, are so polarized to greatly reduce, or most preferably to eliminate, visible color edge jitter, or its adverse effects, in a projected color image. Those of skill will appreciate that either or both of the independent improved methods disclosed herein find broad utility in any color projector.

Figure 7:
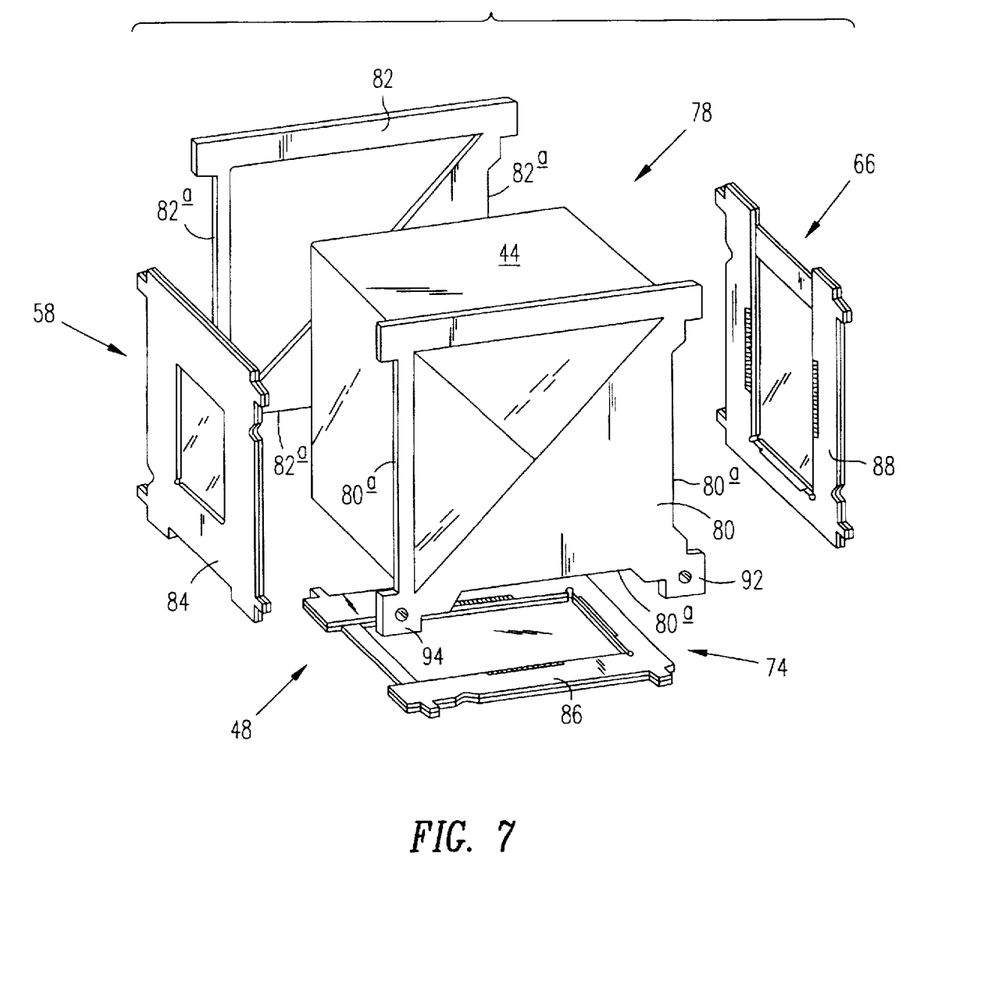
FIG. 7 is a detailed isometric exploded assembly drawing of the prismatic cube frame that forms a part of the invented projector.
Figure 8:
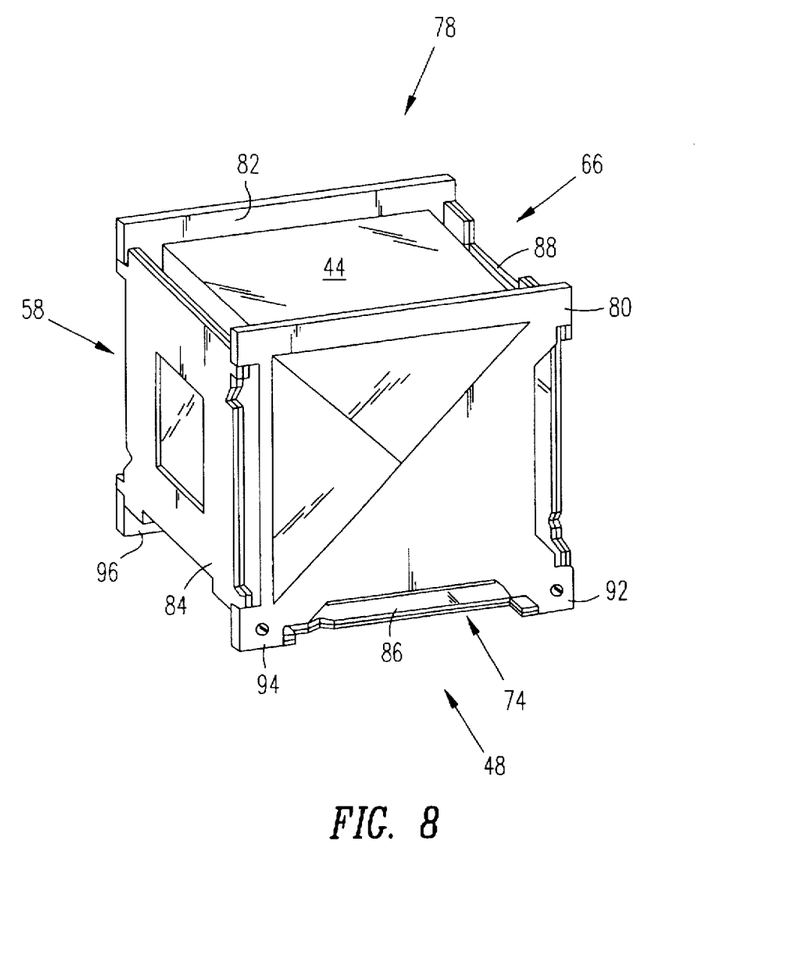
FIG. 8 is a view corresponding generally to FIG. 7 but showing the prismatic cube frame fully assembled.

Turning finally to FIGS. 7 and 8, and viewing them collectively, the invented frame that mounts optical combiner 44 within projector 10 will be described in some detail by reference to the exploded assembly drawing of FIG. 7 and the assembly drawing of FIG. 8. This aspect of the invention involves a prismatic cube-mounting frame indicated generally at 78 for use in an optical projector such as projector 10. Frame 78 preferably includes first and second opposing frame members 80, 82 extending around a first and opposing face of the prismatic cube such a X-cube combiner 44, as indicated. Preferably, each of first and second frame members 80, 82 includes a lip region, such as lip regions 80a, 82a, extending beyond the edges of the first and second opposing faces of the cube a predetermined distance, lip regions 80a, 82a defining corresponding opposing edges of first and second frame members 80, 82. At least third and fourth frame members, and preferably also fifth frame members, 84, 86, 88 representing R, G, B beams of light, extend between first and second opposing frame members 80, 82, as shown better in the assembled view of FIG. 8.

It may be seen from FIGS. 7 and 8 that third and fourth frame members 84, 86 bear optical elements thereon through which light beams may be directed into and out of the prismatic cube. Preferably, third and fourth frame members 84, 86 (and most preferably also fifth frame member 88) are adhered to the edges of lip regions 80a, 82a of first and second frame members 80, 82 to position and align the optical elements borne thereby with the prismatic cube. This position and alignment may be better seen from FIG. 8 to insure proper position and orientation of twisted nematic R, G, B LCDs 58, 74, 66 relative to optical combiner 44, which position and alignment are important to producing a high quality image from projector 10.

Thus, one optical element that is mountable in accordance with this aspect of the invention within frame 78 is the light valve that, in accordance with the preferred embodiment of the invention, is implemented as a twisted nematic LCD shutter. Such light valves will be understood by those skilled in the art to control a light beam directed into and out of the corresponding face of the prismatic cube with which the light valve-bearing third and fourth frame members 84, 86 are positioned and aligned at a predetermined distance (Z) therefrom at a predetermined (X) and (Y) position relative thereto, and in a predetermined orientation θ relative thereto. While those skilled in the art will appreciate that, in accordance with the preferred embodiment of invented projector 10, only optical combiner 44 is equipped with such an invented frame 78, it also is possible within the spirit and scope of the invention to mount optical splitter 42 in such an invented frame with the positional and orientational advantages attending thereto.

With first, second, third, fourth and fifth frame members 80, 82, 84, 86, 88 fully assembled, with the proper positioning and orientation determined at the time of assembly by conventional calibration methods, a unitary optical combiner subassembly is produced that is readily mountable within projector 10 without any required repositioning or realignment or recalibration of the light valves relative to the prismatic cube. Such mounting may be made to frame 12 of projector 10, as by the use of a post or other suitable mounting means extending through structure 90 formed within first and second frame members 80, 82. In the preferred embodiment of the invention, structure 90, as may be seen best perhaps from FIG. 7, includes four apertured tabs of which only three such tabs, 92, 94, 96 are depicted, located at corresponding corners thereof by any suitable mounting means, not shown, such as molded plastic posts that form a part of a molded outsert, insert or clamshell assembly of the projector's chassis. Also not shown in FIGS. 6, 7 or 8 for the sake of clarity is means for controlling light valves 58, 66, 74. Such may be conventional, for example, by the use of flex circuits connected to a power-supplied electronic controller for signalling the LCD shutters to produce the desired pixelated modulation of the R, G and B beams to produce the desired multichrome projected image.

Referring in more detail now to FIG. 8, it may be seen that each of third, fourth and fifth frame members 84, 86 and 88 is equipped on its four corners with tabs, or ears, that extend in the horizontal plane relative to frame 12 of projector 10. Those skilled in the art will appreciate that these tabs are useful in aligning and positioning the frame members relative to first and second frame members 80, 82 and provide an edge-confronting surface of third, fourth and fifth frame members 84, 86, 88 for adhering these frame members to first and second frame members 80, 82. First and second frame members 80, 82 may be seen to have complementary notches in their four corners that form part of the edges of their respective lip regions that facilitate positioning and orientation of third, fourth and fifth frame members 84, 86, 88 relative to first and second frame members 80, 82.

It also may be seen perhaps better from FIG. 8 that each of frame members 84, 86, 88 has a laminar structure in which optical elements illustrated as what may be thought of as a window pane within a window frame are sandwiched between laminar halves. The triangular cut-out within each of first and second frame members 80, 82 will be understood to provide for the precise alignment of first and second frame members 80, 82 with optical combiner 44, and permit the extension through the triangular openings of a corresponding triangular feature that is machined or otherwise suitably formed into either end of cube 44. Finally, it may be seen from FIG. 8 that one edge of each of frame members 84, 86, 88 and preferably edge members that share a common plane of the prismatic cube subassembly provide for connection with the ribbon cables described above for purposes of light valve control signalling. Those skilled in the art will appreciate that the invented X-cube mounting frame is useful in a variety of optical projectors including that of the preferred embodiment.

Accordingly, while a preferred embodiment of the invention has been described herein, and preferred methods associated therewith, it is appreciated that modifications are possible that are within the scope of the invention.

It is claimed and desired to secure by letters patent:

1. A prismatic cube-mounting frame for use in an optical projector including a housing, the frame comprising:

first and second opposing frame members extending around a first and opposing face of the prismatic cube, each of said first and second frame members including a lip region extending beyond the edges of the first and second opposing faces of the cube a predetermined distance, said lip regions defining corresponding opposing edges of said first and second frame members;

third and a fourth frame members extending between said first and said second opposing frame members, said third and fourth frame members bearing optical elements thereon through which light beams may be directed into and out of the prismatic cube, said third and fourth frame members being adhered to said edges of said lip regions of said first and second frame members to position and align said optical elements borne thereby with the prismatic cube.

2. The frame of claim 1, wherein at least one of said optical elements includes a light valve for controlling a light beam directed into and out of a corresponding face of the prismatic cube.

3. The frame of claim 1, which further comprises a fifth frame member bearing an optical element thereon through which light beams may be directed into and out of the prismatic cube, said fifth frame member being adhered to said edges of said lip regions of said first and second frame members to position and align said optical element borne thereby with the prismatic cube.

4. The frame of claim 3, wherein at least one of said optical elements includes a light valve for controlling a light beam directed into and out of a corresponding face of the prismatic cube.

5. The frame of claim 1, wherein one of said first and second frame members includes structure for mounting the prismatic cube in the housing.

* * * * *